United States Patent Office 3,294,567
Patented Dec. 27, 1966

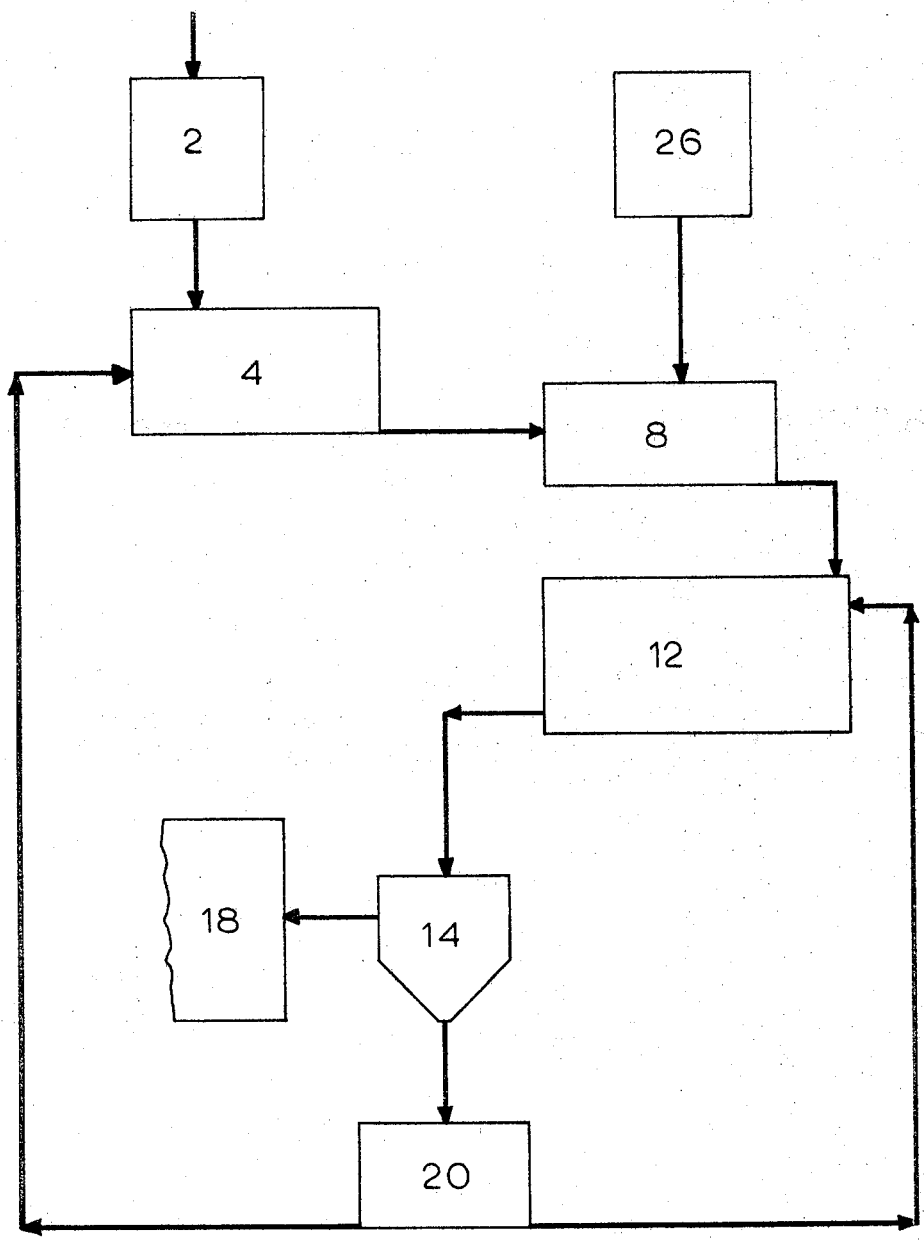

3,294,567
PROCESS FOR PRODUCING INKS
Rollins E. Dobbin and Curt B. Beck, Pampa, Tex., assignors to Cabot Corporation, Boston, Mass., a corporation of Delaware
Continuation of application Ser. No. 162,423, Dec. 27, 1961. This application Jan. 18, 1965, Ser. No. 426,314
5 Claims. (Cl. 106—307)

This application is a continuation of application Serial Number 162,423 filed December 27, 1961 and now abanboned.

This invention relates to inks. More particularly, the invention disclosed herein relates to a process for producing improved newsinks.

It would normally be expected that an old and established art such as ink making would by now be developed to a point approximating perfection. Nevertheless, serious problems often still persist in production of commercially acceptable inks when certain pigments are utilized. In fact, one of the chief problems in ink making today has almost continually plagued the industry since its inception; i.e. the problem of conveniently and economically obtaining an ink meeting the industry's residue specifications. Due to the requirement for low residue, the ink maker has only recently been able to escape the inconvenience attendant the use of the dusty, fluffy form of carbon black which was resorted to in order to obtain the low residue desired with inexpensive milling equipment. The use of carbon black in fluffy form, aside from the obvious undesirable aspects implicit in its handling, also presented additional costs to the industry since special bagging and uneconomical methods of shipment were required to deliver same. A remedy to the necessity for using the fluffy form of carbon black appeared to have been effected when the carbon black industry developed means of agglomerating the carbon black into soft pellets which could apparently be satisfactorily dispersed in ink vehicles by ordinary milling equipment. However, because of the many minor uncontrollable variables inherent in the pelletization process, inks comprising this special pelletized form of carbon black often failed to meet all of the exacting specifications of the ink industry especially with regard to maximum residue specifications. Accordingly, although pelletized carbon black solved most of the major problems posed by the use of their fluffy counterparts nevertheless the inferior inks frequently produced when said pelletized carbon blacks were utilized still left much to be desired.

In the newsink industry, the specifications as to maximum residue allowable are especially stringent. According to the levigation test normally utilized in measuring residue, an acceptable ink is indicated when the maximum residue left on a 325 mesh screen when carbon black is dispersed in an ink vehicle at a carbon black concentration of 10% by means of an Eppenbach-type mill is not over 0.03%. Accordingly, any process which is readily adaptable to already existing commercial practice and which would insure the production of inks which consistently meet and conform to the rigorous residue specifications required by the newsink industry would be a notable and valuable contribution to the art.

The principal object of the present invention is to provide a process which yields improved inks.

Another object of the present invention is to provide a process which insures the production of an ink which consistently conforms to the specifications required by the ink industry.

Still another object of the present invention is to provide a simple, economical process for producing carbon black pellets particularly suitable for use in ink, especially newsinks.

Other objects of the present invention will in part be obvious and will in part appear hereinafter.

The above objects and advantages are realized in accordance with the present invention by utilizing in producing the ink, carbon black pellets from which there has been removed by screening out or otherwise, a certain fraction of the pellets representing those of smallest diameter. We have discovered that the pellets of smallest diameter, which will hereinafter be referred to as the "fines," appear to contain all or at least substantially all of the offending factors responsible for the overall inferior performance of the presently produced inks. Accordingly, we have found that the removal or elimination of these "fines" and the subsequent use of the remaining pellets in the production of inks results in inks which normally invariably meet the residue specifications of the ink industry.

Generally the "fines" represent form about 5 to about 8% by weight of the total pellets of carbon black and usually correspond to those pellets having equivalent diameters of less than about 150 microns. However, in some instances where the pelletization process has been prolonged or carried further, the "fines" which must be removed may include pellets having diameters up to about 280 microns. In such cases the fraction of "fines" removed may be represented by as much as 10% or more by weight of the total pelletized carbon black and sometimes up to about 20%. Accordingly, the amount of "fines" removed in our process will generally represent from about 5 to about 15% by weight of the total pellets but in some cases may amount to as much as 10 to 15% or even 20% by weight of the total original pellets.

We are presently unable to explain precisely why the removal of the "fines" results in the production of a superior ink. According to a hypothesis which we have postulated but to which we do not wish to be bound, we believe that the percent mineral ash, especially iron grit, is present in considerably higher concentration in the "fines" than in other pellet portions and might be the factor which is primarily responsible for the inconsistent and often inferior performance of the resulting inks where said "fines" are not removed. This hypothesis is consistent with our present belief that the undesirable residue often found in inks comprises a nucleus of small ash particles having built up thereon larger particles of carbon black. For example, we have found that the residue to an ink comprising a particular carbon black is greatly decreased when said black in fluffy form is first passed through a Mikro-atomizer rather than the presently used Mikro-pulverizers. Mikro-pulverizers are hammer type mills produced by Pulverizing Machine Co., which are used in the carbon black industry to reduce in excess of 99% of the black to a particle size of less than 44 microns. Mikro-atomizers such as those also produced by Pulverizing Machine Co., are relatively new and have rotating elements consisting of hammers, classifier wheels and fans arranged in such a manner that carbon black particles may be recycled to the grinding zones until they are reduced to a uniform particle size of less than about 12 microns. Accordingly, the Mikro-atomizer treatment is believed to grind the ash particles to such a degree of fineness that they cannot further act as nuclei. Obviously, however, such a treatment especially of all of the carbon black is expensive and inconvenient and accordingly undesirable from a commercial standpoint. Now, however, according to our discovery, such treatment of all the black is unnecessary.

As stated, the regular use of carbon black in pelletized form is relatively new to the art of ink making. However, pelletized carbon blacks especially carbon blacks intended for use in newsink and processes for making same are now well known. (See for example, U.S. Patent 3,011,-

902.) Said pelletization processes essentially involve the mixing of any of the wide variety of carbon blacks available for ink formulation with a definite proportion of oil, or emulsions of oil and water with or without surfactants. The mixture is then agitated in a suitable pelletizer under conditions sufficient to produce a soft, easily dispersible pellet. Generally today, the pellets are produced by uniformly distributing on the fluffy black about 2% to 10% by weight of the black of hot oil and subjecting the mixture to a tumbling type agitation for about one hour. Although many of the present commercial pelletization processes theoretically should consistently produce satisfactory pellets, nevertheless, the inks produced therefrom often fail to meet residue specifications. Thus, our process insures the consistent production of highly dispersible carbon black pellets and in turn commercially acceptable high quality ink, particularly newsink.

The particular oil utilized in producing the inks of the present invention is not critical. Thus, any oil which is normally utilized in producing pellets for newsink use is generally entirely suitable for the purposes of the present invention.

The practice of our invention will be better understood by reference to the attached drawing, in which FIGURE 1 represents a flow sheet describing schematically an arrangement of apparatus satisfactory to produce pellets of carbon black suitable for use in accordance with the present invention.

Referring now to the figure, carbon black is generally fed in fluffy form directly from the production unit (not shown) through a Mikro-pulverizer 2 into an agitator tank 4. In the agitator tank 4, the tapped density of the black is increased to about 8 to 14 lbs./cu. ft. Thereafter the black is conveyed to a wet mixer 8. In the wet mixer a regulated amount of heated oil from reservoir 26 is usually sprayed onto the black. The black and oil mixture is then conveyed to a dry drum pelletizer 12, wherein the black is pelletized to a density of about 15 to 18 lbs./ft.$^3$. Alternatively, the fluffy black and hot oil may be mixed directly in the pelletizing drum 12 by means of a spray nozzle positioned so that the oil impinges on the stream of fluffy black as it enters the pelletizing drum. In such a procedure, the pin type mixer 8 would be eliminated. In any event, in order to produce pellets suitable for use in our improved inks, the so produced pellets are thereafter conveyed from the pelletizer 12 to a screening or separating device 14, whereby the pellet fraction comprised of those pellets smaller than 150 microns and preferably those smaller than 280 microns are removed therefrom. The remaining pellets which generally comprise from about 85 to about 95% by weight of the total original pellets (depending upon the cut removed) are then conveyed to storage 18 and are ready for dispersal in an ink vehicle to produce the improved inks of the present invention. The "fines," i.e. that portion of the pellets removed by device 14, may then be discarded if desired. More preferably however, we have found that the "fines" can be conveyed to a grinding device 20 such as a Mikro-atomizer and after being pulverized therein, can be recycled to either the dry pelletizer drum 12 or to the agitator tank 4 to produce satisfactory pellets.

In order to demonstrate more clearly the beneficial results obtained by our invention and to illustrate manners of practicing same, specific examples are present below. These examples are illustrative in nature and in no way are they to be construed so as to limit the scope of the present invention.

*Example 1*

A fluffy, high abrasion, oil furnace black produced by Cabot Corporation was mixed with 6% mineral oil by weight of the carbon black. The mixing was accomplished by spraying a fine mist of the oil, which had been heated to about 250° F., onto the black as the fluffy black entered a drum-type pelletizer. Subsequently, the mixture of black and oil was pelletized in the pelletizer which rotated at a speed of 15 r.p.m. at a black throughput of 30,000 lbs./day. The pellets produced by this method had a pour density of about 17–19 lbs./ft.$^3$ and a Western Electric crushing strength of from about 13 to 15 lbs. Three samples of the oil bound pellets produced as described above were dispersed to the extent of 10% of the pellets in a newsink oil by means of a colloid mill of the Eppenbach QV-7 type. The percent 325 mesh ink residue of each of the inks was determined in conformity with the aforementioned standard levigation test. The following data was obtained.

TABLE I

| Sample number: | Percent 325 mesh ink residue |
| --- | --- |
| 1 | 0.108 |
| 2 | 0.095 |
| 3 | 0.076 |

Even more serious than the variations in the percent residue of the above inks, which is often encountered in present commercial processes, is the fact that all of the inks had residues which were well in excess of the 0.030 percent residue required by the ink industry.

Next, the pellets from samples identical to those utilized above were screened by 60 mesh Tyler screens so as to remove therefrom those pellets having diameters of less than about 250 microns. Inks were then prepared as above from the pellets having diameters greater than 250 microns.

TABLE II

| Sample Number | Percent by Weight of Total Pellets Removed | Percent 325 Mesh Ink Residue |
| --- | --- | --- |
| 1 | 16.1 | 0.027 |
| 2 | 14.5 | 0.019 |
| 3 | 8.6 | 0.023 |

From the above it may readily be seen that removal of the finer fraction of the pellets resulted in the production of inks which are completely acceptable to the newsink industry.

*Example 2*

An ink made by dispersing 10% by weight of Sterling 99, an oil bound, fine furnace carbon black produced in pelleted form by Cabot Corporation, in a newsink oil by a colloid mill of the Eppenbach QV-7 type had a percent 325 mesh ink residue of 0.034. The pellets of a corresponding sample of Sterling 99 pellets were screened so as to remove that portion of said pellets having diameters less than about 150 microns. The portion removed represented about 4% by weight of the total pellets produced. An ink produced as described above from the remaining coarser pellets has a percent 325 mesh ink residue of 0.027.

Substantially the same results as described above are obtained when pellets produced by other processes are utilized. Thus, those carbon blacks pelletized by agitating a flocculent color black with any suitable pelletizing oil known to the art including oil and water emulsions, and emulsions which also comprise various surfactants can be treated in accordance with the present invention to yield superior carbon black pellets.

The inconsistencies between the percent 325 mesh ink residue of the inks of Table I (0.076–0.108%) of Example 1 graphically illustrate the problems which vex the ink producer. In turn those inconsistencies are usually attributed to the minor uncontrollable variations in the fuels and waters utilized in the production of the carbon black and also to the variables inherent in other operational features all of which render difficult precise control over the properties of the inks produced with the resulting blacks. However, as the above examples illustrate, our process is one which in one aspect—Example 1—represents a method of satisfactorily compensating for these problems and in another aspect—Example 2—represents a method for adjusting and reducing the residue of inks comprising carbon blacks which are produced within or only slightly above the required specification.

*Example 3*

550 lbs. of a fluffy, high abrasion oil furnace carbon black produced by Cabot Corporation was pelletized in accordance with the procedure described in Example 1. The resulting pellets were dispersed to the extent of 10% of the pellets in a newsoil by means of a colloid mill of the Eppenbach QV-7 type. The 325 mesh residue of the resulting ink was 0.045%. Thereafter the pellets were screened so as to remove that portion thereof which will pass through a 65 mesh screen. The pellets of each fraction (+65 mesh and −65 mesh) were dispersed in a newsink oil as described above. The following data was obtained:

| Fraction | Percent Total Pellets | 325 Mesh Residue of Resulting ink |
|---|---|---|
| +65 mesh | 91 | 0.014 |
| −65 mesh | 9 | 0.096 |

The pellets representing the −65 mesh fraction were thereafter reground in a Mikro-pulverizer and after such treatment repelletized. The pellets produced after regrinding of the −65 mesh fraction were dispersed in a newsoil as described above and the percent 325 mesh residue of the resulting ink was found to be 0.010%.

The above example illustrates that not only does the process of the present invention produce inks having satisfactory residue levels but also that such may be obtained without the sacrifice of any of the original carbon black utilized and without involving any significant additional expense. Accordingly, the preferred embodiment of our invention contemplates the separation of the "fines" from commercial pelletized carbon blacks and the subsequent repulverization thereof to produce a product which may be recycled to the pelletization step to produce pelletized carbon blacks entirely suitable for use in the inks of the present invention.

Since the essence of our invention resides essentially in the discovery that inks produced with carbon blacks from which the finer pellets have been removed consistently have residues below 0.03%, there are many possible modifications which can be made in the incidental features of the process. Accordingly, various methods of removing the finer portion of the carbon black pellets such as air elutriation, may be utilized and various pelletized carbon blacks can be treated in accordance with the teachings of our process without departing from the spirit and scope of our invention.

Also, it is obvious that the inks of the present invention can comprise in addition to carbon black and an oil vehicle, any other pigments and/or additives normally added to ink formulations.

Having described our invention, what we declare as new and desire to secure by U.S. Letters Patent is as follows:

1. In a process for the production of carbon black pellets for use in inks which comprises agitating a flocculent color grade carbon black in the presence of a pelletizing medium consisting of oil or oil/water emulsions until said flocculent black has been substantially completely converted into discrete dustless pellets which are suitable for use in inks except for an undesirably elevated levigation factor the improvement which comprises: depressing said levigation factor to an acceptable level by removing from the total mass of said pellets essentially only those pellets having diameters of less than about 280 microns and recovering the remaining pellets as finished product.

2. The process of claim 1 wherein the fine pellets removed represent between about 5 and about 20 weight percent of the total pellets.

3. The process of claim 1 wherein the pellets removed are mechanically pulverized and converted to the fluffy state and thereafter repelletized.

4. In a process for the production of carbon black pellets for use in inks which comprises agitating a flocculent color grade carbon black in the presence of a pelletizing medium consisting of oil or oil/water emulsions until said flocculent black has been substantially completely converted into discrete dustless pellets which are suitable for use in inks except for an undesirably elevated levigation factor the improvement which comprises: depressing said levigation factor to an acceptable level by removing from the total mass of said pellets essentially only those pellets having diameters of less than about 150 microns and recovering the remaining pellets as finished product.

5. The process of claim 4 wherein the fine pellets removed represent between about 5 and about 15 weight percent of the total pellets.

References Cited by the Examiner

UNITED STATES PATENTS

| | | | |
|---|---|---|---|
| 2,167,674 | 8/1939 | Offutt | 106—307 |
| 2,699,381 | 1/1955 | King | 106—307 |
| 2,794,747 | 6/1957 | Bloch | 106—28 |
| 2,891,872 | 6/1959 | Voet | 106—28 |
| 2,942,299 | 6/1960 | Larson | 106—307 |
| 2,953,437 | 9/1960 | Andrews | 23—209.9 |
| 2,960,413 | 11/1960 | Voet | 106—307 |
| 3,005,725 | 10/1961 | Daniell | 106—307 |
| 3,011,902 | 12/1961 | Jordan | 106—307 |

TOBIAS E. LEVOW, *Primary Examiner.*

ALEXANDER H. BRODMERKEL, *Examiner.*

J. B. EVANS, S. E. MOTT, *Assistant Examiners.*